United States Patent [19]

Branlard et al.

[11] 3,872,043

[45] Mar. 18, 1975

[54] PREPARATION OF POLYCHLOROPRENE FOR USE IN ADHESIVES

[75] Inventors: Paul Branlard, Grenoble; Jacques Modiano, Varces, both of France

[73] Assignee: Distugil, Clichy, France

[22] Filed: Nov. 28, 1972

[21] Appl. No.: 310,105

[30] Foreign Application Priority Data
Dec. 9, 1971 France .............................. 71.45172

[52] U.S. Cl. .......................... 260/23.7 H, 260/27 BB
[51] Int. Cl. ........................... C08c 11/72, C08d 9/14
[58] Field of Search .................... 210/23.7 H, 27 BB

[56] References Cited
UNITED STATES PATENTS

| | | | |
|---|---|---|---|
| 2,264,173 | 11/1941 | Collins | 260/27 BY |
| 2,918,442 | 12/1959 | Gerrard | 260/25 |
| 3,053,824 | 9/1962 | Heinz | 260/23 H |
| 3,190,865 | 6/1965 | Miller | 260/23.7 H |
| 3,444,152 | 5/1969 | Gintz | 260/23.7 H |

FOREIGN PATENTS OR APPLICATIONS

| | | | |
|---|---|---|---|
| 905,824 | 9/1962 | United Kingdom | 260/23.7 H |
| 1,531,379 | 5/1968 | France | |

*Primary Examiner*—Melvyn I. Marquis
*Assistant Examiner*—William E. Parker
*Attorney, Agent, or Firm*—Browdy and Neimark

[57] ABSTRACT

Polychloroprene for use in adhesive compositions and having the advantage of remaining in a single phase is prepared by effecting polychloroprene polymerization in the presence of a binary emulsifying system of 1.8 to 3% of resinic derivative and 0.1 to 1% of a fatty acid or salt thereof. Alternatively, a ternary emulsifying system may be used comprising 1 to 3% of the resinic derivative, 0.1 to 1.5% of the fatty acid or salt therof and 0.1 to 2.5% of a sticking agent of a colophony derivative or a polydiene resin.

13 Claims, No Drawings

PREPARATION OF POLYCHLOROPRENE FOR USE IN ADHESIVES

FIELD OF INVENTION

The present invention relates to the preparation of polychloroprene and, more particularly, the preparation and use in adhesive compositions of a polychloroprene rubber which is not subject to phase separation in adhesive compositions.

BACKGROUND OF INVENTION

Polychloroprene has been long used as an adhesive and glue component. The polychloroprene rubber has been used in various adhesive compositions, for example it has been mixed with a small quantity of zinc oxide, and it has also been mixed with phenolic resins which are reacted with an excess of magnesia. The polychloroprene resin adhesives, referred to as "magnesium pre-reacted," provide a good adhesive mixture having superior mechanical properties and good heat resistance. Generally, these various adhesive compositions vary in their properties somewhat, dependent upon the particular components utilized, the quantities of the various components and the selection of solvent. However, such prior art polychloroprene adhesives and glues, regardless of their precise composition, are provided in the form of an opaque suspension of magnesia and zinc oxide, dispersed in the pre-reacted solution of polychloroprene, rubber and phenolic resin.

While these prior compositions have good properties, they suffer from one serious defect, i.e. the opaque suspension is not stable. In other words, the final adhesive mixture has the undesirable characteristic of separating into two phases. The period after which separation into two phases occurs depends somewhat on the nature of the solvent mixture and on the phenolic resin, but regardless of the composition, destabilization and separation into two phases occur. Thus, over a period of time, sedimentation develops resulting in an upper layer which is first translucent and which then becomes transparent over a longer period, while the lower phase remains very opaque. While this separation does not alter adhesive quality if the two phases are mixed, it nevertheless constitutes a merchandising problem and also constitutes an inconvenience to the user of the adhesive. In fact, this has presented such a problem that various attempts, so far commercially unsuitable, have been made to obviate this problem.

Study of the cause of phase separation has indicated that it occurs from the formation of a complex between magnesium, phenolic resin and resinic acids which are present in the polychloroprene. Indeed, resinic acid soaps are commonly used in the emulsion polymerization of the polychloroprene and, in fact, in the final product the resinic acid and/or its salts are found in proportions of 4 to 6% by weight based on the weight of the polychloroprene product after separation of the polychloroprene from its emulsifying system followed by washing and drying. Because of the large quantity of resinic acid present in the complex, it has been found that such complex is only slightly soluble in the commonly used solvent systems. Since the resinic acid and its salts have extreme fineness and great volume, they posses such a structure that, during sedimentation, they induce settling of the insoluble ingredients which would normally otherwise remain suspended in the adhesive mixture.

One of the proposed solutions to overcome this difficult problem is set forth in French Patent 1,531,379, Dec. 5, 1966, and involves a process for extracting from the various commercial grades of polychloroprene the major part of the resinic compounds such as acids and salts, which can not be separated during rubber fabrication. This extraction must be sufficiently extensive to bring the content of resinic derivatives to below 2% based on the weight of polychloroprene. To accomplish this objective, the polychloroprene rubber is dissolved in a convenient solvent or solvent mixture and is then reprecipitated by adding a non-solvent for the polychloroprene, which non-solvent is a good solvent for the resinic compounds. However, this has not proven to be satisfactory commercial procedure because such an operation, besides having high costs, is generally difficult to apply for glues and adhesive components.

Another procedure which has been contemplated involves the selection of an emulsifying system which contains reduced quantities of resinic acid and salts. In this way it has been contemplated that polychloroprene polymerization could be carried out in such a way that the final polymer, without any further treatment, would contain a quantity of resinic acid and salt which is lower than the quantity usually present in the various grades of polychloroprene presently available. In this way, it has been hoped the phase separation problem can be obviated.

With this purpose in mind, chloroprene polymerization has been carried out in the presence of a low quantity of resinic acid, ranging from 1 to 2% by weight with regard to the monomer. By following out such procedures it is possible to obtain polychloroprene grades having high crystallization, useable in glues and adhesives; however, by the use of only 1 to 2% by weight of resinic acid, various other problems are encountered which, in total, make industrial exploitation very difficult, if not impossible. Thus, though the quantity of resinic acid is theoretically sufficient to ensure a convenient micelle coating rate using only 1 to 2% by weight resinic acid, it is found that the polymerization speed is too slow, and furthermore that the polymerization stops even before the chloroprene conversion reaches the desired minimum quantity of 70 to 80%. This operation has other difficulties as well; thus, in spite of the presence of convenient stabilizing agents, the removal of non-transformed chloroprene vapors from the polymerization medium must be stopped frequently because of latex coagulation or flocculation, and this makes the running of the operation very delicate and difficult.

It thus appears that the presence of some resinic acid is indipensable to provide the best processing conditions for chloroprene polymerization. By resinic acid and/or its salts, what is meant is the acids and salts from natural acidic resins or resinoic acid, such as rosin, copal, cauri, sandaric, shellac, jalap, guaiac and Canada balsam. These acids and salts, also called resin acids and their salts, which are usually found in crude mixtures and are, as pointed out above, used conventionally in the polymerization of chloroprene, include pimaric acid, abietic acid, benzoin, quaiac resinic acid, succinic acid, jalapic acid, kaurolic acid, etc. For example, in French patent 1,531,379, the specified resinic acid salt is sodium rosinate.

SUMMARY OF INVENTION

It is, accordingly, an object of the present invention to overcome the deficiencies of the prior art such as indicated above.

It is another object of the present invention to provide for polychloroprene adhesives which, while having good adhesive properties, do not suffer from phase separation.

It is another object of the present invention to provide an improved chloroprene polymerization which results in a polychloroprene which will not suffer phase separation in adhesive compositions.

It is another object of the present invention to provide an improved emulsifying system for use in the polymerization of chloroprene.

Given the disadvantages of prior systems stated above, the present invention provides an emulsifying system which, on the one hand, permits chloroprene polymerization to proceed at a sufficient speed and giving a latex which has good stability, while, on the other hand, avoiding the problem of phase separation of the resultant polychloroprene in the final adhesive mixture.

Accordingly, it is an object of the present invention to provide a polychloroprene fabrication process which may be carried out under convenient industrial conditions, in the presence of an emulsifying mixture which does not induce the formation of phase separation when the resultant polychloroprene is used in adhesive mixtures. The invention has also for an object the preparation of adhesive mixtures based on polychloroprene obtained according to such process.

These and other objects and the nature and advantages of the instant invention will be more apparent from the following detailed description of embodiments of the present invention.

DETAILED DESCRIPTION OF EMBODIMENTS

The present process involves carrying out the chloroprene polymerization in the presence of a binary emulsifying system, the composition of which is 1.8 to 3% by weight of resinic acid or salt and 0.1 to 1% by weight of a saturated or unsaturated fatty acid or an alkali or alkaline earth salt thereof, based on the weight of the chloroprene. Based on a chloroprene conversion of 80%, the obtained polychloroprene contains 2 to about 3% resinic acid and/or salt. In certain circumstances this low quantity of resinic derivative and the presence of fatty acids may give rise to a lack of adhesive properties, particularly when large proportions of fatty acid are present.

To meet this disadvantage, it is possible to add to the rubber an agent providing improved adhesive properties. This permits the increase in the percentage of fatty acid and/or salt and according to the nature of the sticking agent, permits decrease in the content of resinic acid and/or salt. Indeed, in the case when the sticking agent is a rosin ester, it is possible to decrease the content of resinic acid, keeping in mind that the total quantity of resinic derivatives in the chloroprene is also greater that 2% by weight.

The addition of sticking agent may be made either in the mixture before polymerization or in the latex obtained before chloroprene vapor removal. Preferably, the sticking agent is added in a quantity between 0.1 and 2% by weight based on the weight of the chloroprene. In this case, the emulsifying system is a ternary mixture, the weight composition of which with regard to the chloroprene is from 1 to 3% by weight of resinic acid or salt, 0.1 to 1.5% by weight of fatty acid or salt and 0.1 to 2.5 of the sticking agent which gives the polychloroprene improved adhesive properties. To some extend, the precise quantities of each of the components of the ternary mixture will depend upon the nature of the sticking agent. Thus, if the sticking agent is a rosin ester, the percentage of resinic acid or salt, for example rosin, added will be between 1 and 3% by weight. If, on the other hand, the sticking agent is not a rosin ester, the percentage of resinic acid or salts will be between 1.8 and 3% by weight.

Use of the ternary or binary systems, as disclosed above, provides an effective operation in which the latex is stabilized sufficiently during fabrication and treatment so as to inhibit phase separation. Moreover, the presence of the fatty acid or salt permits the polymerization of the chloroprene to be effected to a conversion of 80%, in a commercially suitable time of from about 8 to 10 hours.

For purposes of the present invention, the resinic derivatives used comprise various types of rosin or colophony such as non-modified rosin, disproportionated rosin, hydrogenated rosin, and the various alkaline soaps, i.e. the alkaline metal, alkaline earth metal, ammonium and magnesium salts of the aforementioned types of rosin.

The saturated or unsaturated fatty acids may be used either directly in the form of acid, in the form of acid and salt mixture, or in the form of the salts. The fatty acid salts contemplated are the alkali metal salts, the alkaline earth metal salts, the ammonia salts, and the magnesium salts. The preferred fatty acids are selected from the group consisting of lauric acid, myristic acid, palmitic acid, stearic acid, oleic acid, and the synthetic fatty acids, For ease of usage and efficiency, oleic acid or its alkaline salts are preferred. It should be understood that the fatty acids may be used in any mixture, natural or synthetic and, in fact, mixtures of the salts and the fatty acids may be used.

As a sticking agent there may be used any one or a mixture of the esters of the various types of rosins mentioned above, i.e. non-modified rosin, disproportionated rosin, or hydrogenated rosin. Methyl alcohol, ethyl alcohol, glycerol, pentaerythritol constitute the preferred esterification alcohols of these rosins. It is also possible to use polydiene resin, obtained from petroleum, as the sticking agent.

The invention will be better understood from consideration of the following specific examples which are given in a non-limitative way.

EXAMPLE 1

There is loaded in a polymerization reactor:

| | |
|---|---|
| Chloroprene | 100 parts by weight |
| Water | 100 parts by weight |
| Resinic acid: disproportionated rosin (registered trademark "Phedre V" of Passicos Society) | 2 parts by weight |
| Sodium oleate | 0.4 parts by weight |
| Soda (100%) | 0.46 parts by weight |
| Sodium salt of sulfonic methylene-bis-alkyl-naphtalene acids ("Distabex LS", registered trademark of the Compagnie Française des Matieres Colorantes) | 0.875 parts by wt. |
| n-dodecylmercaptan | 0.145 parts by wt. |

-Continued

| With an initial catalyst composed of: | | |
|---|---|---|
| A) Ferrous sulfate (7 H$_2$O) | 0.00384 | parts by wt. |
| Disodic salt of tetracetic ethylene diamine acid ("Masquol B", registered trademark of PROTEX Society) | 0.00577 | parts by wt. |
| Soda | 0.00124 | parts by wt. |
| Water | 1.026 | parts by wt. |
| B) Sodium dithionite | 0.0294 | parts by wt. |
| Water | 0.588 | parts by wt. |

Polymerization is carried out for 10 hours at +10°C. by adjusting to a convenient rate the feed of an aqueous solution of ammonium persulfate.

Polymerization is stopped at a conversion of 80% of chloroprene with the mixture:

| Chloroprene | 0.8 parts by wt. |
|---|---|
| Sodium lauryl sulfate | 0.02 parts by wt. |
| Phenothiazine | 0.01 parts by wt. |
| Water | 2.93 parts by wt. |

Lastly, 0.4 parts by weight of ditertiobutyl paracresol in solution in latex chloroprene (2.93 parts by weight) is added.

Vapor removal and latex insulation are conducted according to the methods commonly used for polychloroprene. Especially pure latex is obtained at pH 6.5 on a drum cooled at −20°C. The obtained film is washed and dried. A polychloroprene rubber containing 2.15% by weight of resinic acid is obtained.

EXAMPLE 2

Loading in the polymerization reactor according to Example 1 is modified as follows:

| Disproportionated rosin replaced by hydrogenated rosin | part by weight per part by weight |
|---|---|
| Sodium oleate | 0.6 parts by weight |
| Soda (100%) | 0.48 parts by weight |

Polymerization is carried out for 9 hours under Example 1 conditions. The obtained polychloroprene rubber contains 2.4% of resinic acid.

EXAMPLE 3

Loading in the polymerization reactor according to Example 1 is modified as follows:

| Disproportionated rosin (Resin 731 S of HERCULES Society) | 1.9 parts by weight |
|---|---|
| Na oleate | 0.8 parts by weight |
| NaOH (100%) | 0.43 parts by weight |

Polymerization is carried out for 8 hours according to Example 1 conditions.

The obtained polychloroprene rubber contains 2.10% of resinic acid.

EXAMPLE 4

Loading in polymerization container is identical to Example 3. In addition, there is added:

| Glycerol ester of disproportionated rosin (registered trademark "Resosol GD" of Passicos Society) | 0.5 part by wt. |
|---|---|

Polymerization is carried out for 8 hours according to Example 1 conditions.

EXAMPLE 5

Loading in polymerization container is identical to Example 4 except for the proportions of some products:

| Resinic acid - disproportionated rosin | 1.8 part by wt. |
|---|---|
| Na oleate | 1 part by wt. |
| Glycerol ester of disproportionated rosin | 0.8 part by wt. |

Polymerization is carried out for 9 hours according to Example 1 conditions.

EXAMPLE 6

Loading in polymerization container is identical to Example 3 but there is added:

| Methyl ester of hydrogenated rosin (registered trademark HERCOLYN D of HERCULES Society) | 0.5 part by wt. |
|---|---|

Polymerization is carried out for 10 according to Example 1 conditions.

The precipitation of latex residual monomer is made industrially without any difficulty and rubber separation leads to a film having a sufficient "sticking capacity."

EXAMPLE 7

Loading in the polymerization reactor is identical to Example 5, except that the glycerol ester of disproportionated rosin is replaced by methyl ester of hydrogenated, part for part.

Polymerization is carried out for 9 hours according to Example 1 conditions.

No anomaly appears during vapor removal and separation.

EXAMPLE 8

Loading of the polymerization reactor is identical to Example 3 but 0.5 part by weight of polydienic resin (registered trademark "ESCOREZ 1071" OF ESSO Society) is added.

Polymerization is carried out for 10 hours according to Example 1 conditions.

No anomaly appears during vapor removal and separation.

EXAMPLE 9

Loading of the polymerization reactor is identical to EXAMPLE 3 but 0.5 part by weight of polydienic resin ("PICCOPALE 70 SF" of PICCO Society) is added.

Polymerization is carried out for 10 hours according to Example 1 conditions.

No anomaly appears during vapor removal and separation.

EXAMPLE 10

Loading of the polymerization reactor is identical to Example 3, but 0.5 part by weight of disproportionated rosin methyl ester is added.

Polymerization is carried out for 10 hours according to Example 1 conditions.

The precipitation of latex residual monomer is made industrially without any difficulty and rubber separation leads to a film having a sufficient "sticking capacity."

With polychlorprene rubbers obtained in the above examples, adhesive mixtures are prepared according to the following formula:

| | |
|---|---|
| Polychloroprene rubber | 100 parts by wt. |
| Magnesium oxide | 8 parts by wt. |
| Zinc oxide | 5 parts by wt. |
| Ditertiarybutyl paracresol | 2 parts by wt. |
| Phenolic resin (CKR 1634, Union Carbide Society) | 40 parts by wt. |
| Methylethylketone | 106 parts by wt. |
| Ethyl acetate | 106 parts by wt. |
| Oil C.* | 85 parts by wt. |
| Cyclohexane | 169 parts by wt. |

*Oil C corresponds to petroleum cut SBP No. 2 (Standard boiling point).

After the adhesive compositions using the rubbers of Examples 1 – 10 are prepared, the possible appearance of phase separation phenomenon in the adhesive mixtures is studied. In all the cases, after six months of storage, no separation is observed mixtures are always homogeneous.

It will be obvious to those skilled in the art that various changes may be made without departing from the scope of the invention and the invention is not to be considered limited to what is described in the specification.

What is claimed is:

1. Process for the production of polychloroprene rubber in an aqueous emulsion, comprising polymerizing chloroprene in the presence of an emulsifying system, the weight composition of which with regard to chloroprene is 1.8 to 3% of resinic acid or salt selected from the group consisting of non-modified rosin, disproportioned rosin, hydrogenated rosin and their alkaline soaps and 0.1 to 1% of saturated or unsaturated fatty acid selected from the group consisting of lauric acid, myristic acid, stearic acid, oleic acid, palmitic acid, and synthetic fatty acid, an alkaline salt of said fatty acid, a mixture of said fatty acids, mixtures of said alkaline salts, or mixtures of said fatty acids and alkaline salts.

2. Process according to claim 1 comprising adding a sticking agent in an amount effective to give chloroprene rubber improved adhesive properties.

3. Process according to claim 2 wherein said chloroprene polymerization is carried out in the presence of a ternary system, the weight composition of which with regard to chloroprene is 1 to 3% of said resinic acid or salt, 0.1 to 1.5% of said fatty acid or alkaline salt thereof and 0.1 to 2% of said sticking agent.

4. Process according to claim 2 wherein said sticking agent is a rosin ester.

5. Process according to claim 4 in which chloroprene polymerization is carried out in the presence of a system, weight composition of which with regard to chloroprene is 1 to 3% of said resinic acid or salt, 0.1 to 1.5% of said fatty acids or alkaline salts thereof and 1 to 2% of said rosin ester.

6. Process according to claim 2 wherein said sticking agent is a polydiene resin from petroleum.

7. Process according to claim 6 wherein the chloroprene polymerization is made in the presence of a system, the weight composition of which with regard to chloroprene is 1.8 to 3% of said resinic acid or salt, 0.1 to 1.5% of said saturated or unsaturated fatty acid or alkaline salt thereof and 0.1 to 2% of said polydiene resin from petroleum.

8. Polychloroprene rubber obtained by a process according to claim 2.

9. An adhesive composition comprising the polychloroprene rubber of claim 8, magnesium oxide, zinc oxide, phenolic resin and solvent, said composition maintaining a single phase.

10. Polychloroprene rubber obtained by a process according to claim 1.

11. A process for the production of an adhesive composition which is not subject to phase separation comprising:

polymerizing chloroprene in an aqueous emulsion in the presence of an emulsifying system, the weight composition of which with regard to chloroprene is 1.8 to 3% of resinic acid or salt selected from the group consisting of non-modified rosin, disproportionated rosin, hydrogenated rosin and their alkaline soaps and 0.1 to 1% of saturated or unsaturated fatty acid selected from the group consisting of lauric acid, myristic acid, stearic acid, oleic acid, palmitic acid, and synthetic fatty acid, an alkaline salt of said fatty acid, a mixture of said fatty acids, mixtures of said alkaline salts, or mixtures of said fatty acids and alkaline salts;

separating the polychloroprene from the product of said polymerizing step; and mixing with magnesium oxide, zinc oxide, phenolic resin and solvent in amounts effective to produce an adhesive composition.

12. A process in accordance with claim 11 further including the step of adding a sticking agent to said polymerizing step in an amount effective to give chloroprene rubber improved adhesive properties.

13. An adhesive composition comprising the polychloroprene rubber of claim 10, magnesium oxide, zinc oxide, phenolic resin and solvent, said composition maintaining a single phase.

* * * * *